United States Patent [19]

Sassa

[11] Patent Number: 4,946,736

[45] Date of Patent: Aug. 7, 1990

[54] PROTECTIVE ELECTROMAGNETICALLY TRANSPARENT WINDOW

[75] Inventor: Robert L. Sassa, Newark, Del.

[73] Assignee: W. L. Gore & Associates, Inc., Newark, Del.

[21] Appl. No.: 425,454

[22] Filed: May 26, 1989

Related U.S. Application Data

[63] Continuation of Ser. No. 83,746, Aug. 6, 1987, abandoned.

[51] Int. Cl.[5] .......................... B32B 7/12; B32B 27/08

[52] U.S. Cl. .................................... 428/245; 156/324; 428/246; 428/265; 428/422

[58] Field of Search ............... 428/422, 245, 246, 265, 428/212, 252, 91; 156/324; 264/288.8

[56] References Cited

U.S. PATENT DOCUMENTS

| | | | |
|---|---|---|---|
| 2,731,068 | 1/1956 | Richards | 156/324 |
| 3,953,566 | 2/1976 | Gore | 264/288.8 X |
| 4,000,348 | 12/1976 | Harlow | 428/422 |
| 4,025,679 | 5/1977 | Denny | 428/91 |
| 4,610,918 | 9/1986 | Effenberger et al. | 428/245 |
| 4,613,540 | 9/1986 | Traut et al. | 428/212 |
| 4,615,933 | 10/1986 | Traut | 428/252 |

FOREIGN PATENT DOCUMENTS

| | | |
|---|---|---|
| 0125955 | 11/1984 | European Pat. Off. . |
| 0155599 | 3/1985 | European Pat. Off. . |
| 0158116 | 3/1985 | European Pat. Off. . |
| 0159942 | 10/1985 | European Pat. Off. . |
| 3421196 | 6/1984 | Fed. Rep. of Germany . |

OTHER PUBLICATIONS

Birch et al., Applied Optics, vol. 22, No. 19, pp. 2947-2949 (1983).

*Primary Examiner*—Thomas J. Herbert

[57] ABSTRACT

A weather-, moisture, and gas-resistant radome and laminate for radomes comprising layers of porous expanded polytetrafluoroethylene (EPTFE) membrane, fluorinated thermoplastic membrane, and woven EPTFE textile backing fabric. Superior electromagnetically transmission characteristics, excellent physical and electrical properties.

7 Claims, 3 Drawing Sheets

PROTECTIVE ELECTROMAGNETICALLY TRANSPARENT WINDOW

This application is a continuation of application Ser. No. 083,746, filed Aug. 6, 1987, now abandoned.

FIELD OF THE INVENTION

The present invention relates to covering and protecting radio antenna such as radar antennas, against weather and moisture, while remaining electromagnetically transparent.

BACKGROUND OF THE INVENTION

Large radio antennas, such as radar installations and radio telescopes, often need a covering structure of some kind to protect them from the weather, i.e. sunlight, wind, and moisture and which will preferably be gas tight, this covering structure is refered to as a radome. One type of radome is an inflatable radome. In this case, a gas-tight balloon shrouds the antenna. A blower inflates the balloon and spaces the structure away from the antenna so that the antenna may move or rotate freely. A popular form of such covering is the geodesic dome or metal space frame radome, which is formed from many metal (or other structural material) geometric shaped segments, such as triangles and others, which are covered with an appropriate radio frequency transmitting membrane, then affixed to each other to form an approximately spherical dome surrounding the radar antenna, which rotates or moves inside the radome. Positive gas pressure is not required inside the metal space frame radome, but may be useful at times, for example, to dislodge snow from the outside of the dome, or to aid in controlling the environment within the dome. Another type of installation has solid segmented covering doors over the radio antenna which open to allow the antenna to function through the opening. On each side of the opening is affixed a semicircular track, up which is drawn each edge of a large, nearly electromagnetically transparent sheet of protective membrane to cover the antenna while in use. Other forms of antennas can also be suitably covered by such membranes held above or affixed around them in various ways to keep out moisture and the effects of weather.

While useful in varying degrees, the various forms and compositions of membrane hitherto known in the art, such as polytetrafluoroethylene fiber-glass laminates, have not solved all of the problems associated with use of this type of covering for protecting radio antennas.

BRIEF SUMMARY OF THE PRESENT INVENTION

The present invention is a weather-, moisture-, and gas-resistant structure for enclosing and protecting a radio antenna having superior electromagnetic transmission characteristics and physical properties, which includes a layer of a laminate, which comprises adhered layers of polytetrafluoroethylene (PTFE) membrane, thermoplastic polymer, and backing fabric of woven fibers of PTFE. The preferred membranes and fibers are of porous PTFE and preferably of porous expanded PTFE (EPTFE) prepared as described in U.S. Pat. Nos. 3,953,566, 4,096,227, 4,187,390, 4,110,392, 4,025,679, 3,962,153, and 4,482,516.

DETAILED DESCRIPTION OF THE PREFERRED EMBODIMENTS

Figure 1:
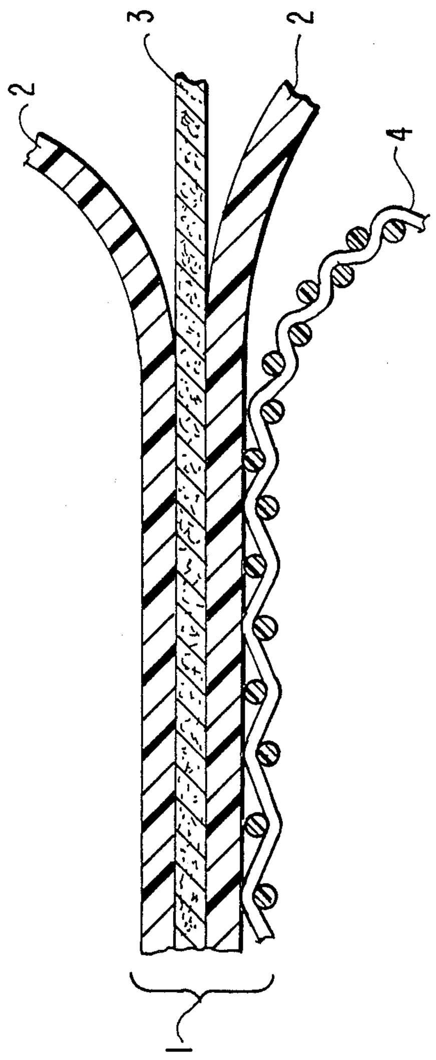
FIG. 1 is a cross-section of a preferred laminate of the invention.

The preferred embodiments of the present invention can best be described in terms of the drawings. FIG. 1 describes a laminate 1 of the invention in cross-section to show the various layers. The outer layer 2 is formed from PTFE, preferably porous PTFE, and most preferably EPTFE, the porous expanded PTFE membrane material made by stretching PTFE in the manner described in the U.S. patents listed above. EPTFE has superior dielectric constant and loss tangent characteristics thus aiding electromagnetic transmission. Outer layer 2 is bonded by means of a thermoplastic polymer layer 3 to a second layer 2 of EPTFE which has previously been adhered or bonded to a textile backing layer 4 comprising woven fibers of PTFE. Here again, the preferred form of PTFE is EPTFE.

Layer 3 of thermoplastic polymer is preferably a fluorinated ethylene-propylene co-polymer (FEP), but other fluorinated thermoplastic polymers might be used where their PTFE-adhesive properties, radar wavelength transparency, and gas-resistant properties are suitable for use in the particular laminate being prepared. Other non-fluorinated thermoplastic polymers may be used for layer 3 where they meet the criteria of sufficient adhesiveness, electromagnetic transmission characteristics, and gas-proofness or gas-resistance to be adequately functional and useful. Useful thermoplastic polymers may include perfluoroalkoxytetrafluoroethylene polymers, ethylene-tetrafluorofluoroethylene copolymers, copolymers of vinylidene fluoride and hexafluoropropylene, polychlorotrifluoroethylene, copolymer of hexafluoropropylene and tetrafluoroethylene, polyethylene, and polypropylene. Layer 4 is a woven textile backing fabric for the laminate where the fibers are PTFE, preferably porous PTFE, and most preferably EPTFE. Layer 4 provides strength properties to the laminate, and additional layers of this material may be added where an increase in laminate strength is needed and desired.

The woven PTFE or EPTFE fabric is coated with commercially available PTFE dispersion or thermoplastic polymer dispersion to about three to ten percent by weight dispersed PTFE add-on and laminated to an EPTFE film under hot pinch-roll conditions under pressure. Another EPTFE membrane is adhered to FEP film under heat and pressure. The FEP side of this second laminate is then laminated to the EPTFE side of the first laminate by hot pressure rolling to form a four-layer laminate, such as that depicted in cross-section in FIG. 1. Additional pairs of layers 2 and 3 may be laminated to the EPTFE face of the laminate in like manner, if desired, to change the electromagnetic transmission characteristics or gas resistance. Some variation among the fluorinated thermoplastics available for layer 3 may be utilized as well to adjust the electromagnetic transmission characteristics and frequency demand. The laminate provides significant gas-resistance or gas-proof properties associated with the thermoplastic layer (or layers) so as to be useful for positive pressure type structures in which gas pressure within the dome or shelter holds the covering away from the rotating or moving parts of the antenna housed therein.

Figure 2:
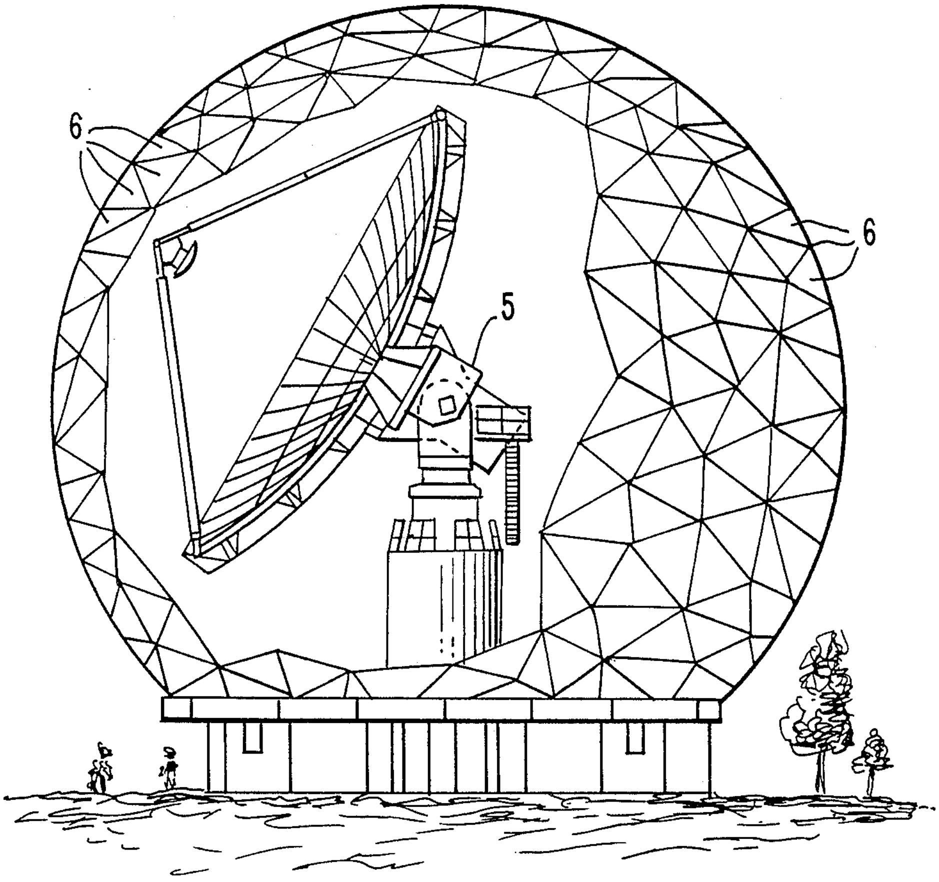
FIG. 2 depicts a broken view of a space frame radome covering and protecting a rotating radio antenna.

FIG. 2 shows a large metal space frame radome for sheltering and enclosing a radio antenna 5. The segments 6 of the dome have been made by covering geometric shaped frames, usually of metal or other stiff construction materials such as metal or plastic tubing or shaped bar stock, with laminate of this invention. Segments 6 are then assembled into a radome as shown. Other methods for making such a frame, not involving geometric segments, can be made to serve as well and other methods for covering the domes with the laminate 1 of the invention may be used.

Figure 3:
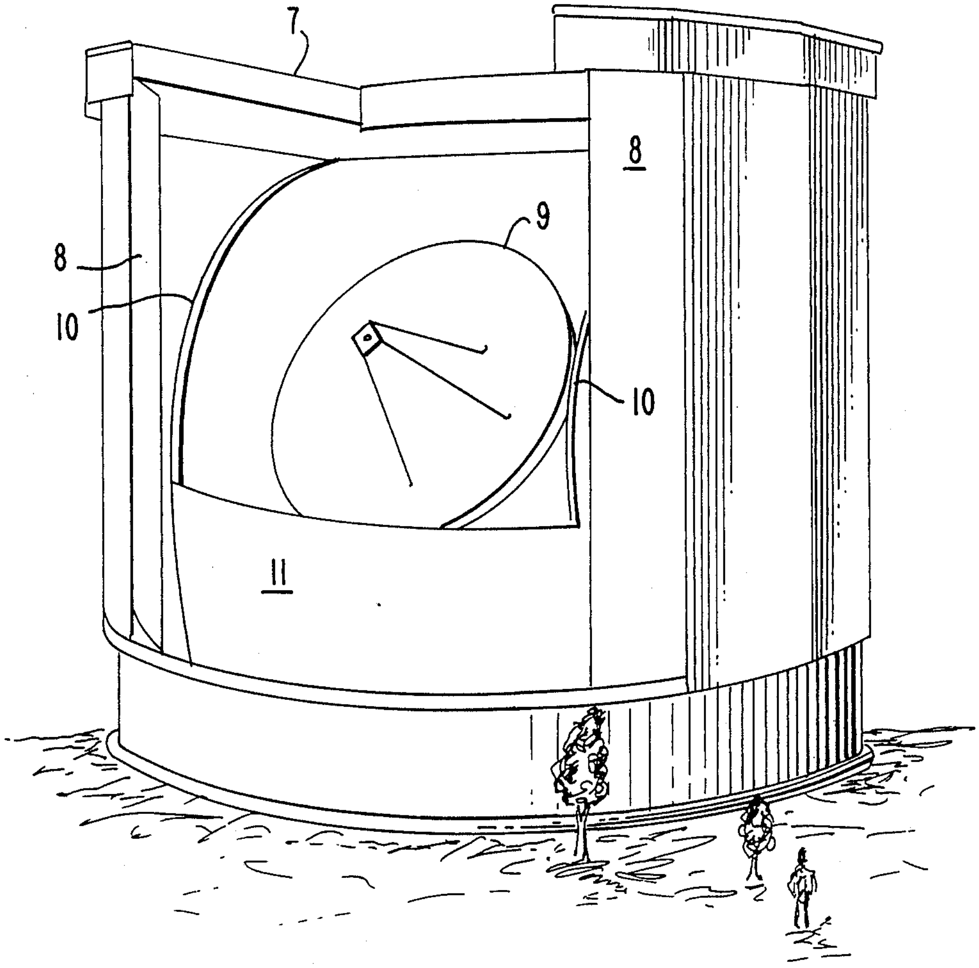
FIG. 3 shows a radio telescope housing, where shutter and doors are drawn aside and a covering sheet of composite membrane is being drawn over the antenna.

FIG. 3 depicts a different type of housing or shelter for a radio antenna 9, in which the entire housing revolves, a roof shutter 7 and doors 8 roll out of the way of antenna 9, and a large sheltering sheet 11 of composite membrane of the invention is drawn up track 10 to which it is attached at each end to protect the antenna while it is in use. Sheet 11 of FIG. 3 and the covering 6 of each segment of the geodesic dome of FIG. 2 each embody one form of the present invention. Other shapes and forms of shelter or cover for antennas will no doubt come to mind to one experienced in the art of radio antennas, radomes, and any viewing aperture in an existing building, but so long as the laminates of this invention are utilized, this invention is being practiced. The laminates are inert to and unaffected by the elements, including sunlight, ozone, temperature extremes, wind, rain, and snow, and are inert, hydrophobic and gas-resistant. They are very thin and strong, have excellent color reflectance and electromagnetic transmission, low dielectric constant, and low loss tangent. The laminates when used in radomes reduce maintenance costs, provide lower cost structural enclosures, allow more accurate measurements, and provide for increased viewing time, do not need to be painted or otherwise maintained as do other materials, and have low adhesion and excellent release for snow and ice which might form on the surface of the radome. The laminates may be useful in protective garments for protection against chemicals or corrosive media or atmospheres, as flange covers in chemical manufacturing plants, and in architectual structures.

I claim:

1. A weather and moisture resistant laminate comprising adhered layers, in sequence, of:

(a) a first layer of porous expanded polytetrafluoroethylene;

(b) thermoplastic polymer that is an adhesive for layers (a) and (c);

(c) a second layer of porous expanded polytetrafluoroethylene disposed on the other side of layer (b) than the first layer (a); and (d) a backing fabric consisting essentially of woven fibers of porous expanded polytetrafluoroethylene.

2. A laminate of claim 1, wherein the thermoplastic polymer is selected from perfluoroalkoxy tetrafluoroethylene, ethylene-tetrafluoroethylene copolymer, copolymer of vinylidene fluoride and chlorotrifluoroethylene, copolymer of vinylidene fluoride and hexafluoropropylene, polychlorotrifluoroethylene, copolymer of hexafluoropropylene and tetrafluoroethylene, polyethylene, fluorinated ethylene propylene copolymer, and polypropylene.

3. A laminate of claim 1, wherein the thermoplastic polymer is a fluorinated ethylene propylene copolymer.

4. A process for protecting a radio antenna from weather, moisture, and damage from contact with moving parts of the antenna comprising the steps of:

(a) covering said antenna at a specified distance from said moving parts with a gas-resistant multilayer laminate window consisting essentially of in order
  (1) a layer of polytetrafluoroethylene membrane,
  (2) a layer of gas-resistant thermoplastic polymer,
  (3) a layer of polytetrafluoroethylene membrane, and
  (4) a layer of woven polytetrafluoroethylene textile backing fabric; and (b) maintaining a small positive atmospheric pressure differential within the window housing said antenna to aid in supporting said laminate window.

5. A process of claim 4, wherein the polytetrafluoroethylene polymer is porous expanded polytetrafluoroethylene.

6. A process of claim 5, wherein the thermoplastic polymer is selected from fluorinated ethylene propylene copolymer, perfluoroalkoxy tetrafluoroethylene, ethylene-tetrafluoroethylene copolymers, copolymer of vinylidene fluoride and chlorotrifluoroethylene, copolymers of vinylidene fluoride and hexafluoropropylene, polychlorotrifluoroethylene, copolymer of hexafluoropropylene and tetrafluoroethylene, polyethylene, and polypropylene.

7. A process of claim 6, wherein the thermoplastic polymer is a fluorinated ethylene propylene copolymer.

* * * * *